(12) United States Patent
Zhang et al.

(10) Patent No.: US 11,119,911 B2
(45) Date of Patent: Sep. 14, 2021

(54) GARBAGE COLLECTION METHOD AND DEVICE

(71) Applicant: Alibaba Group Holding Limited, Grand Cayman (KY)

(72) Inventors: Jie Zhang, Hangzhou (CN); Chen Zhang, Hangzhou (CN); Le He, Hangzhou (CN); Yingjie Shi, Hangzhou (CN); Yan Huang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 543 days.

(21) Appl. No.: 16/085,510

(22) PCT Filed: Mar. 7, 2017

(86) PCT No.: PCT/CN2017/075830
§ 371 (c)(1),
(2) Date: Mar. 11, 2019

(87) PCT Pub. No.: WO2017/157199
PCT Pub. Date: Sep. 21, 2017

(65) Prior Publication Data
US 2019/0196965 A1    Jun. 27, 2019

(30) Foreign Application Priority Data
Mar. 17, 2016   (CN) .......................... 201610154498.6

(51) Int. Cl.
*G06F 12/02*   (2006.01)
*G06F 16/17*   (2019.01)

(52) U.S. Cl.
CPC ...... *G06F 12/0253* (2013.01); *G06F 16/1727* (2019.01); *G06F 2212/702* (2013.01)

(58) Field of Classification Search
CPC .......................... G06F 12/0253; G06F 16/1727
See application file for complete search history.

(56) References Cited

U.S. PATENT DOCUMENTS

| | | | |
|---|---|---|---|
| 6,519,594 B1 * | 2/2003 | Li | G06F 9/44563 707/704 |
| 8,825,720 B1 * | 9/2014 | Xie | G06F 16/1727 707/813 |
| 10,990,518 B1 * | 4/2021 | Wallace | G06F 16/1727 |

(Continued)

FOREIGN PATENT DOCUMENTS

| | | |
|---|---|---|
| CN | 102722417 | 10/2012 |
| CN | 103336744 | 10/2013 |

(Continued)

OTHER PUBLICATIONS

Soman et al., Application-Specific Garbage Collection, 2007, Journal of Systems and Software, vol. 80, Issue 7, pp. 1037-1056. (Year: 2007).*

(Continued)

*Primary Examiner* — Kris E Mackes (57) ABSTRACT

Heterogeneous garbage types are collected by scanning all of the service items to identify all of the service types that are included within the service items, identifying garbage collection components that correspond with the service types, and then collecting garbage for the corresponding target service types by using the corresponding garbage collection components.

27 Claims, 8 Drawing Sheets (56) References Cited

U.S. PATENT DOCUMENTS

| | | | |
|---|---|---|---|
| 2003/0041141 A1 | 2/2003 | Abdelaziz et al. | |
| 2003/0058277 A1 | 3/2003 | Bowman-Amuah | |
| 2004/0031038 A1 | 2/2004 | Hugly et al. | |
| 2004/0044727 A1 | 3/2004 | Abdelaziz et al. | |
| 2004/0064512 A1 | 4/2004 | Arora et al. | |
| 2004/0064568 A1 | 4/2004 | Arora et al. | |
| 2004/0064693 A1 | 4/2004 | Pabla et al. | |
| 2004/0098447 A1 | 5/2004 | Verbeke et al. | |
| 2004/0133640 A1 | 7/2004 | Yeager et al. | |
| 2004/0148326 A1 | 7/2004 | Nadgir et al. | |
| 2004/0162871 A1 | 8/2004 | Pabla et al. | |
| 2005/0193269 A1 | 9/2005 | Haswell et al. | |
| 2006/0059253 A1 | 3/2006 | Goodman et al. | |
| 2006/0230124 A1 | 10/2006 | Belfiore et al. | |
| 2007/0033273 A1 | 2/2007 | White et al. | |
| 2009/0228870 A1 | 9/2009 | Kao et al. | |
| 2012/0023558 A1 | 1/2012 | Rafiq | |
| 2012/0069131 A1 | 3/2012 | Abelow | |
| 2012/0191716 A1 | 7/2012 | Omoigui | |
| 2013/0066717 A1 | 3/2013 | Marovets | |
| 2014/0115291 A1* | 4/2014 | Caspole | G06F 12/0269 711/166 |
| 2015/0067293 A1* | 3/2015 | Flood | G06F 12/0269 711/170 |
| 2016/0086108 A1 | 3/2016 | Abelow | |
| 2016/0224768 A1 | 8/2016 | Boccon-Gibod et al. | |
| 2018/0024964 A1 | 1/2018 | Mao et al. | |
| 2018/0039560 A1 | 2/2018 | Altman et al. | |
| 2018/0107281 A1 | 4/2018 | Kramer et al. | |

FOREIGN PATENT DOCUMENTS

| | | |
|---|---|---|
| CN | 103336744 A | 10/2013 |
| CN | 103559443 | 2/2014 |
| CN | 103617023 A | 3/2014 |
| CN | 103678349 | 3/2014 |
| CN | 103927198 | 7/2014 |
| CN | 104156414 A | 11/2014 |
| EP | 2990945 | 3/2016 |

OTHER PUBLICATIONS

Ding, Hua, "Modem Design of Electrical Traction Shearers Based on Knowledge Engineering", Dec. 31, 2015.

Sunil Soman et al.,"Dynamic Selection of Application-Specific Garbage Collectors", The 2004 International Symposium on Memory Management; Vancouver, British Columbia, Canada, Oct. 24-25, 2004; Co-located with OOPSLA 2004, New York, N: ACM, US. Oct. 24, 2004, pp. 49-60.

* cited by examiner

GARBAGE COLLECTION METHOD AND DEVICE

CROSS-REFERENCE TO RELATED APPLICATIONS

This application is a National Stage Application of, and claims priority to, International Patent Application PCT/CN2017/075830, filed on Feb. 27, 2017, which claims priority from Chinese Patent Application No. CN 201610154498.6, filed on Mar. 17, 2016, which applications are incorporated herein by reference in their entirety.

BACKGROUND OF THE INVENTION

1. Field of the Invention

The present invention relates to computers and, in particular, to a garbage collection method and apparatus.

2. Description of the Related Art

The existing Oracle Internet Directory Garbage Collection Framework supports collection of Lightweight Directory Access Protocol (LDAP) garbage. On the other hand, the Adobe AEM's garbage collection system is used for collection of garbage for packets, temporary files, and workflow load. In addition, the WorldServer's garbage collection system mainly collects garbage generated in a database.

As can be seen from the above, the existing garbage collection systems are generally used for collection of garbage types having the same field features, and are not applicable to scenarios where various heterogeneous garbage needs to be collected.

SUMMARY OF THE INVENTION

The present invention provides an approach to collecting heterogeneous garbage types. The present invention includes a method of garbage collection that includes scanning all service items to generate a first list of scanned service items. The service items include applications stored on a storage media. Each service item includes one or more target service types. The first list of scanned service items includes a number of target service types. The target service types include functions provided by the applications. The method also includes determining a number of target components such that each target service type has a corresponding target component. The number of target components includes a number of garbage collecting logics such that each target component has a corresponding garbage collecting logic. Each garbage collecting logic is different. The method further includes collecting garbage for each target service type on the first list of scanned service items using the target component that corresponds with each target service type to collect heterogeneous garbage types.

The present invention also includes a garbage collection apparatus that has a memory, and a processor coupled to the memory to execute instructions stored in the memory. The processor to scan all service items to generate a first list of scanned service items. The service items include applications stored on a storage media. Each service item includes one or more target service types. The first list of scanned service items includes a number of target service types. The target service types include functions provided by the applications. The processor to further determine a number of target components such that each target service type has a corresponding target component. The number of target components includes a number of garbage collecting logics such that each target component has a corresponding garbage collecting logic. Each garbage collecting logic is different. In addition, the processor to collect garbage for each target service type on the first list of scanned service items using the target component that corresponds with each target service type to collect heterogeneous garbage types.

The present invention additionally includes a non-transitory computer-readable storage medium that has embedded therein program instructions, which when executed by a processor causes the processor to execute a method of unlocking a shared object. The method includes scanning all service items to generate a first list of scanned service items. The service items include applications stored on a storage media. Each service item includes one or more target service types. The first list of scanned service items includes a number of target service types. The target service types include functions provided by the applications. The method also includes determining a number of target components such that each target service type has a corresponding target component. The number of target components includes a number of garbage collecting logics such that each target component has a corresponding garbage collecting logic. Each garbage collecting logic is different. Further, the method includes collecting garbage for each target service type on the first list of scanned service items using the target component that corresponds with each target service type to collect heterogeneous garbage types.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The accompanying drawings described herein are used for providing further understanding of the present application and constitute a part of the present application. Exemplary embodiments of the present application and the description thereof are used for explaining the present application and do not constitute limitations on the present application.

DETAILED DESCRIPTION OF THE INVENTION

Figure 1:
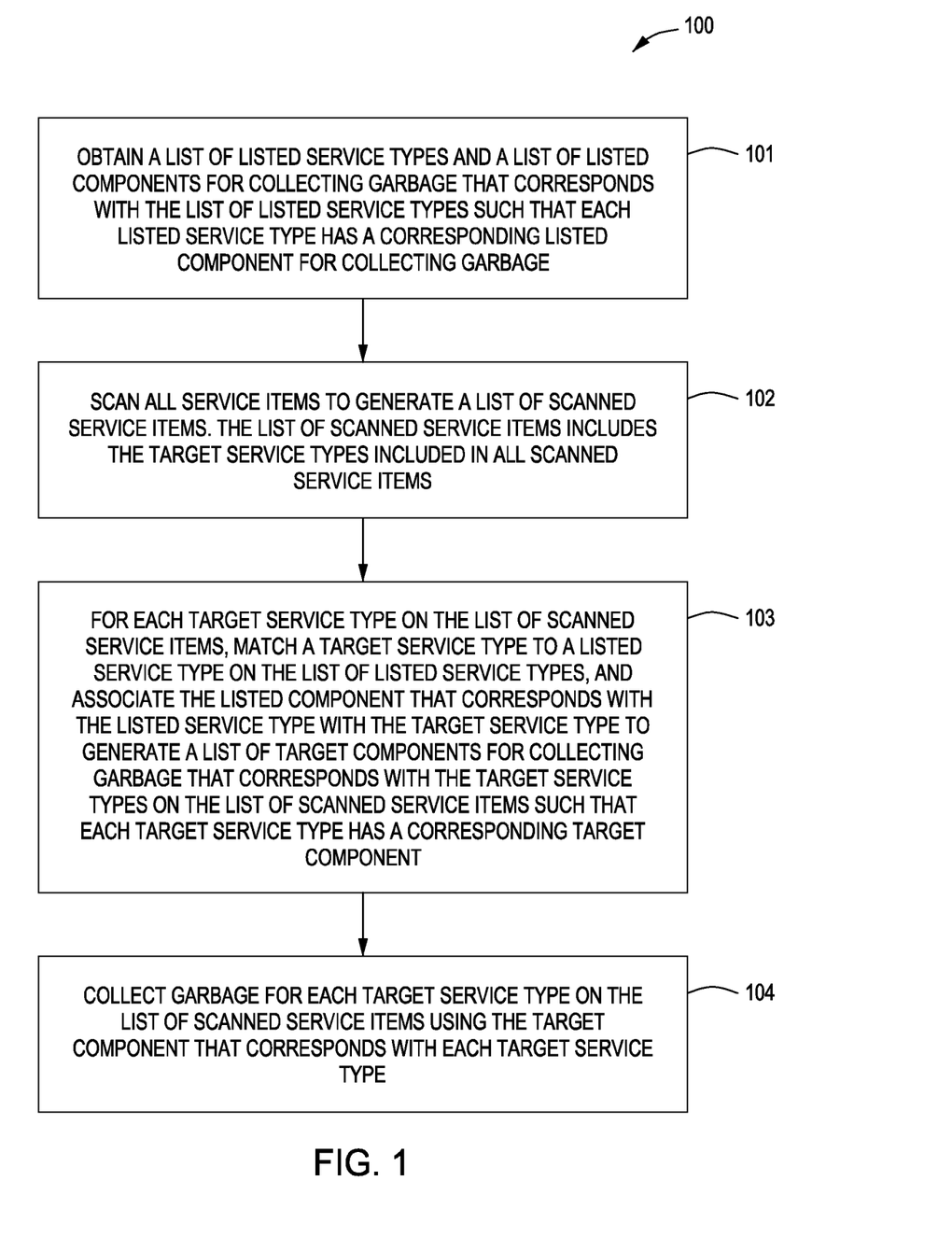
FIG. 1 is a flowchart illustrating an example of a method 100 of collecting garbage in accordance with the present invention.

FIG. 1 shows a flowchart that illustrates an example of a method 100 of collecting garbage in accordance with the present invention. As described in greater detail below, the present invention collects heterogenous types of garbage, such as Lightweight Directory Access Protocol (LDAP) garbage, Adobe packet, temporary file, and workflow load garbage, and database garbage.

As shown in FIG. 1, method 100 begins at 101 by obtaining a list of listed service types, and a list of listed components for collecting garbage that corresponds with the list of listed service types such that each listed service type has a corresponding listed component for collecting garbage.

Specifically, a collection component that corresponds to each service type is established. In some applications, two or more service types have the same garbage collection logic. In order to save resources, the service types that have the same garbage collection logic may share and reuse a collection component. In this case, a collection component that corresponds to all of the service types that have the same garbage collection logic is established, wherein all of the service types that have the same garbage collection logic share and reuse the corresponding collection component.

For example, a service type A and a service type B have the same garbage collection logic, and a corresponding collection component 1 is established for the service type A and the service type B. The service type A and the service type B share and reuse the collection component 1. Similarly, a service type D and a service type G have the same garbage collection logic. A collection component 5 is established for the service type D and the service type G, and the service type D and the service type G share and reuse the collection component 5.

Further, for the service types that have different garbage collection logic, corresponding collection components are respectively established for each of the other service types. For example, the garbage collection logic of the service type C, the garbage collection logic of the service type E, and the garbage collection logic of the service type F are all different. As a result, a corresponding collection component 2, collection component 3, and collection component 4 are respectively established for the service type C, the service type E, and the service type F.

In order to dynamically expand the garbage type, in this embodiment, the garbage collection logic is encapsulated by the collection component, and the collection component has a hot-swap function. Based on the collection component, the garbage type can be flexibly expanded. Further, in order to implement collection of a large amount of heterogeneous garbage types, in this embodiment, different collection components are established for different service types.

Generally, one service type corresponds to at least one collection component. In the garbage collection method provided in this embodiment, the collection component (established by using the service type as the granularity) improves the versatility of the method, making the method applicable to the environment where big data processing is needed.

Following this, method 100 moves to 102 to scan all of the service items to generate a list of scanned service items. The service items include applications stored on a storage media. In addition, each service item includes one or more target service types. Further, the list of scanned service items includes a number of target service types, i.e., includes the target service types that are included in all of the scanned service items. The target service types include functions provided by the applications. In this embodiment, all the service items are scanned, and a service item list is generated based on the scanning result. The service item list includes the target service types included in all of the service items. After generating the service item list, the service item list may be stored.

A user may set a scan collection cycle according to service scenarios. For example, the user may set a time interval through a front end interface, and the cycle may be set at hourly/daily/weekly/monthly intervals. After the scan has been started, the garbage collection process starts automatically. In this embodiment, all the service items are scanned periodically, so as to automatically trigger a garbage collection process. Optionally, operations on the front end interface can be performed manually by the user, so as to start a scan to complete the garbage collection process.

Method 100 next moves to 103 where, for each target service type on the list of scanned service items, method 100 matches a target service type to a listed service type on the list of listed service types, and associates the listed component that corresponds with the listed service type with the target service type to generate a list of target components for collecting garbage that corresponds with the target service types on the list of scanned service items such that each target service type has a corresponding target component.

In 103, method 100 determines a number of target components for collecting garbage such that each target service type has a corresponding target component. The number of target components includes a number of garbage collecting logics such that each target component has a corresponding garbage collecting logic. In addition, each garbage collecting logic is different.

After the target service types included in all the service items are obtained, because each service type corresponds to at least one collection component, the target collection component corresponding to the target service type is determined according to the included target service type. Different service types correspond to different collection components.

After the target components for collecting garbage have been determined, method 100 moves to 104 to collect garbage for each target service type on the list of scanned service items using the target component that corresponds with each target service type. In other words, method 100 collects garbage for the corresponding target service types by using each of the target collection components. After all the target collection components are obtained, garbage generated by the corresponding target service types is collected by using the target collection components.

Specifically, the target service types included in each service item are used as a task which is allocated to corresponding target collection components. All the target collection components are loaded, and thread pools needed by the target collection components are allocated. The target collection components are started to use the allocated thread pools to execute the garbage collection logic.

The target collection components perform garbage collection for the corresponding target service types. A plurality of thread pools may be allocated to the target collection components. When there are a plurality of thread pools, the target collection components may execute the garbage collection logic in parallel to perform garbage collection for the corresponding target service types.

In the garbage collection method provided in this embodiment, target service types included in all service items are obtained. Target collection components corresponding to the target service types are determined, and garbage for the corresponding target service types are collected by using the target collection components.

In this embodiment, collection components are established by using the service type as granularity, and different collection components are established to correspond to different service types. Performing garbage collection based on these components can flexibly extend the scope of the service types, thereby achieving the collection of heterogeneous service types with good versatility.

Figure 2A:
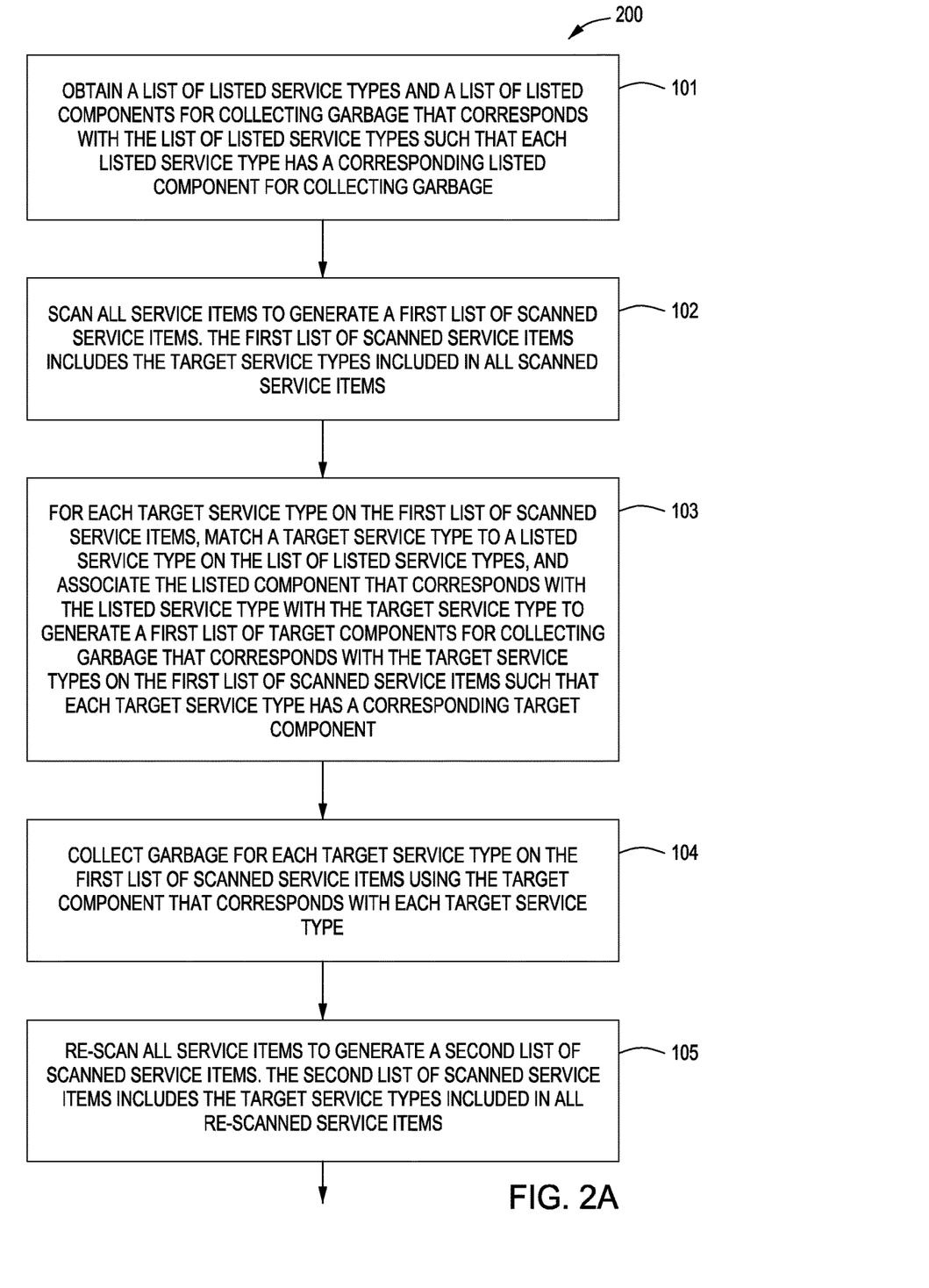
FIGS. 2A-2C are a flow chart illustrating an example of a method 200 of collecting garbage in accordance with the present invention.
Figure 2B:
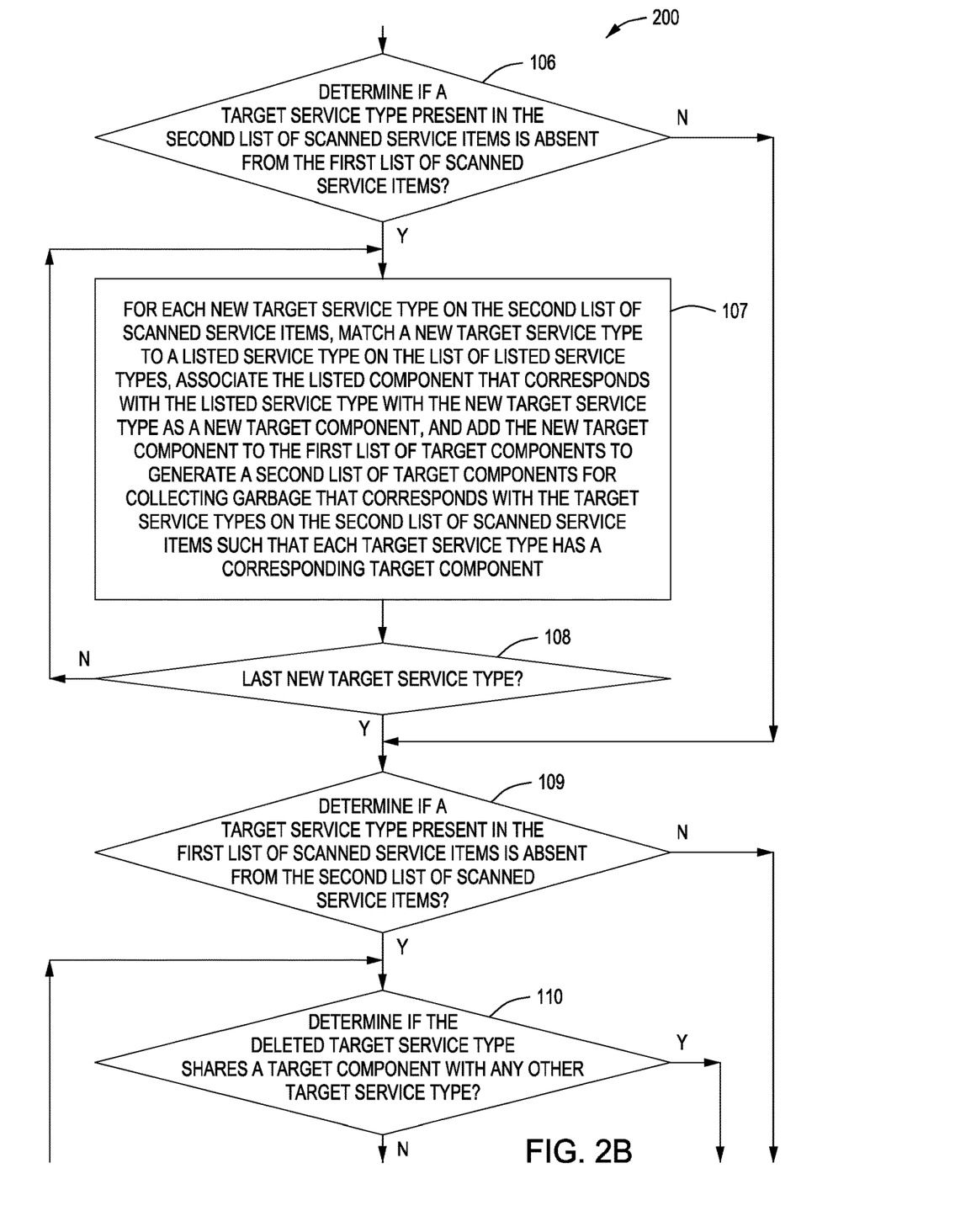
Figure 2C:
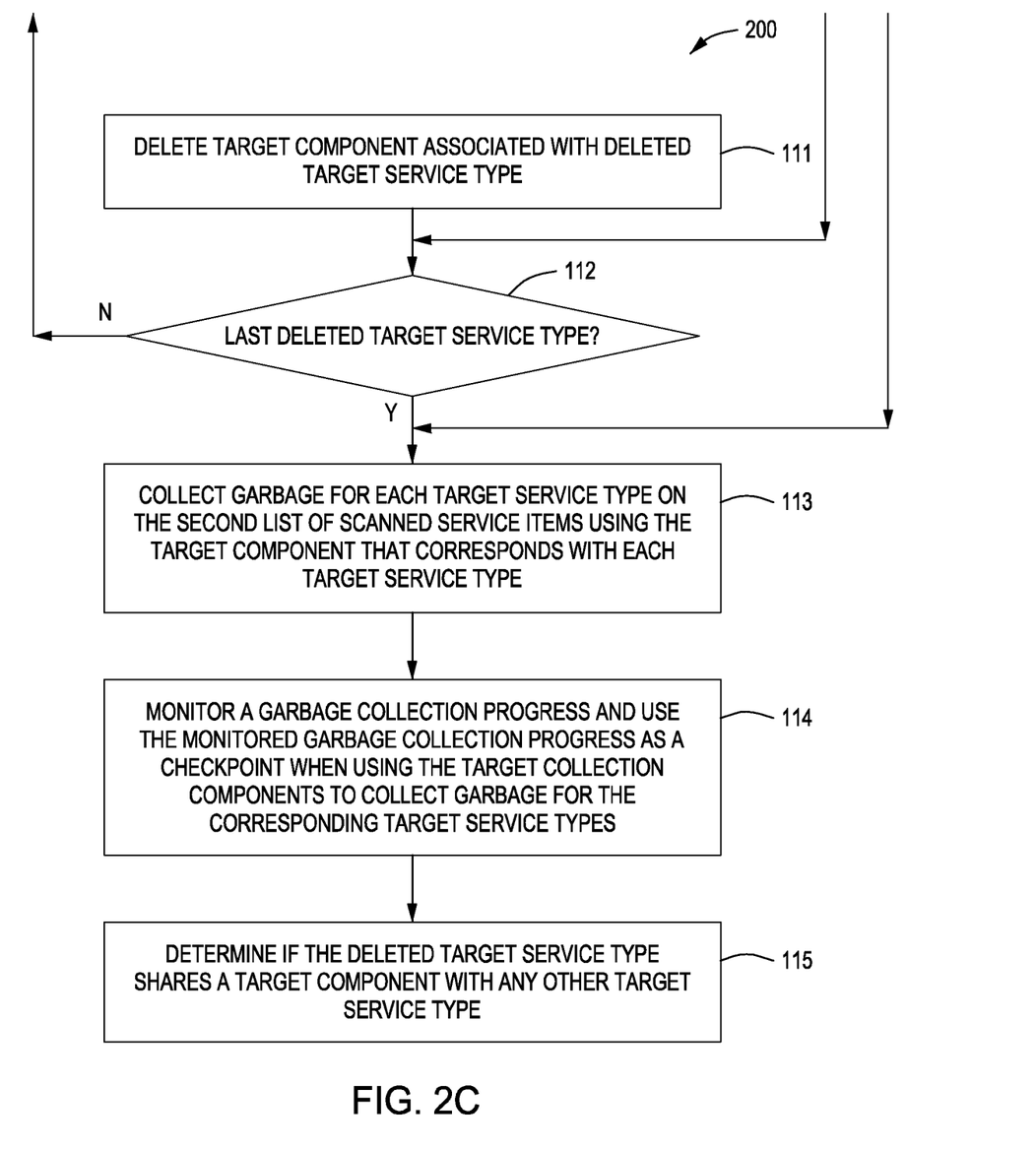

FIGS. 2A-2C show a flowchart that illustrates an example of a method 200 of collecting garbage in accordance with the present invention. Method 200 is similar to method 100 and, as a result, utilizes the same reference numerals to designate the elements that are common to both methods. As shown in FIG. 2A, method 200 first differs from method 100 at 105 where method 200 re-scans all of the service items to generate a second list of scanned service items. The second list of scanned service items includes the target service types that are included in all of the re-scanned service items.

All of the service items may be scanned periodically, and method 200 represents a periodic re-scan of all of the service items. For example, the user may set a time interval through a front end interface, and the cycle may be set at hourly/daily/weekly/monthly intervals. After the scan has been started, the garbage collection process starts automatically. Optionally, operations on the front end interface can be performed manually by the user, so as to start a scan to complete the garbage collection process.

The second list of service items includes the target service types included in all of the service items. Thus, all of the service items are re-scanned and, after re-scanning, a re-scanning result is obtained. The re-scanning result includes the service types included in each re-scanned service item, and the second list of service items is generated based on the scanning result.

That is to say, the second service item list includes the target service types included in all of the service items. The generated second service item list includes an identifier of a service item, an identifier of a target service type, and a corresponding relationship between the service item and the included target service type. After the second service item list has been obtained through re-scanning, the second service item list may be stored.

Method 200 next moves to 106 to determine if a target service type present in the second list of scanned service items is absent from the first list of scanned service items. In 106, method 200 judges whether a new target service type exists in the service item list from the re-scan that was absent from the service item list generated after the previous scan. If the judging result is positive, method 200 moves to 107, otherwise method 200 proceeds to 109.

When a new target service type has been added, method 200 moves to 107 where, for each new target service type on the second list of scanned service items, method 200 matches a new target service type to a listed service type on the list of listed service types, and associates the listed component that corresponds with the listed service type with the new target service type as a new target component.

In addition, method 200 adds the new target component to the first list of target components to generate a second list of target components for collecting garbage that corresponds with the target service types on the second list of scanned service items such that each target service type on the second list of scanned service items has a corresponding target component on the second list of target components.

In 107, method 200 obtains a new target collection component corresponding to the new target service type. After a new target service type has been obtained, a new target collection component corresponding to the new target service type is added to a device for managing the collection components. Before the new target collection component is added, it needs to be established by a management person according to the garbage collection logic of the target service type.

Following this, method 200 moves to 108 to determine if the new target service type is the last new target service type, returns to 107 if new target service types remain, and moves to 109 when no new target service types remain. In 109, method 200 determines if a target service type present in the first list of scanned service items is absent from the second list of scanned service items.

In 109, method 200 obtains deleted target service types of each service item according to the service item list. Specifically, method 200 judges whether a target service type present in the first list of scanned service items from the previous scan is absent from the second list of scanned service items from the current re-scan. If the judging result is positive, method 200 moves to 110, otherwise method 200 proceeds to 113.

When a target service type has been deleted and is absent from the second list of scanned service types, method 200 moves to 110 to determine if the deleted target service type shares a target component with any other target service type. For each service item, method 200 judges whether the target collection component corresponding to the deleted target service type is shared and reused by other target service types in the service item list. For each service item, when the deleted target service type is determined, it needs to be judged whether the target collection component corresponding to the deleted target service type is shared and reused by at least one of the other target service types in the service item list.

Here, the target collection component corresponding to the deleted target service type is called a to-be-deleted target collection component. If the to-be-deleted target collection component is not shared and reused by other service types, it indicates that the to-be-deleted target collection component can be deleted. In this case, method 200 moves to 111. In step 111, method 200 deletes the target collection component corresponding to the deleted target service type.

If the to-be-deleted target collection component is shared and reused by other service types in 110, it indicates that the to-be-deleted target collection component cannot be deleted just yet. The to-be-deleted target collection component is kept. In this case, method 200 moves to from 110 to 112. After the target collection component corresponding to the deleted target service type is deleted in 111, method 200 moves to 112.

In 112, method 200 determines if the deleted target service type is the last deleted target service type, returns to 110 if deleted target service types remain, and moves to 113 when no deleted target service types remain. In 113, method 200 collects garbage for each target service type in the second list of scanned service items using the target component that corresponds with each target service type in the second list of scanned service items.

Method 200 collects garbage for the corresponding target service types by using each of the target collection components. After the corresponding target collection components are determined for all the target service types, garbage for the corresponding target service types can be collected by using each of the target collection components. To avoid repetition regarding the specific process of the garbage collection, reference can be made to the above description.

In this embodiment, performing garbage collection based on the collection components meets the needs for collecting a large amount of heterogeneous garbage types on a big data open processing platform. Based on the hot-swap function of the collection components, the collection components have good dynamic extensibility and can effectively support garbage generated by new service types, which in turn is applicable to a big data processing environment.

Method 200 next moves to 114 to monitor, when using the target collection components to collect garbage for the corresponding target service types, a garbage collection progress and use the monitored garbage collection progress as a checkpoint. Following this, method 200 moves to 115 to perform, when a breakpoint occurs in the garbage collection process, breakpoint recovery by using the checkpoint closest to the breakpoint time.

In this embodiment, a snapshot function is provided in the garbage collection method, which can be triggered periodically. In the process of using the collection components to collect garbage for various service types, a garbage collection progress is monitored. After the snapshot function is triggered, the garbage collection progress at the moment is recorded, and the monitored garbage collection progress is marked as a checkpoint, and then the checkpoint is stored in a disk. In the garbage collection process, if an abnormal situation occurs which the garbage collection to be interrupted, breakpoint recovery may be performed based on the closest checkpoint.

Figure 3:
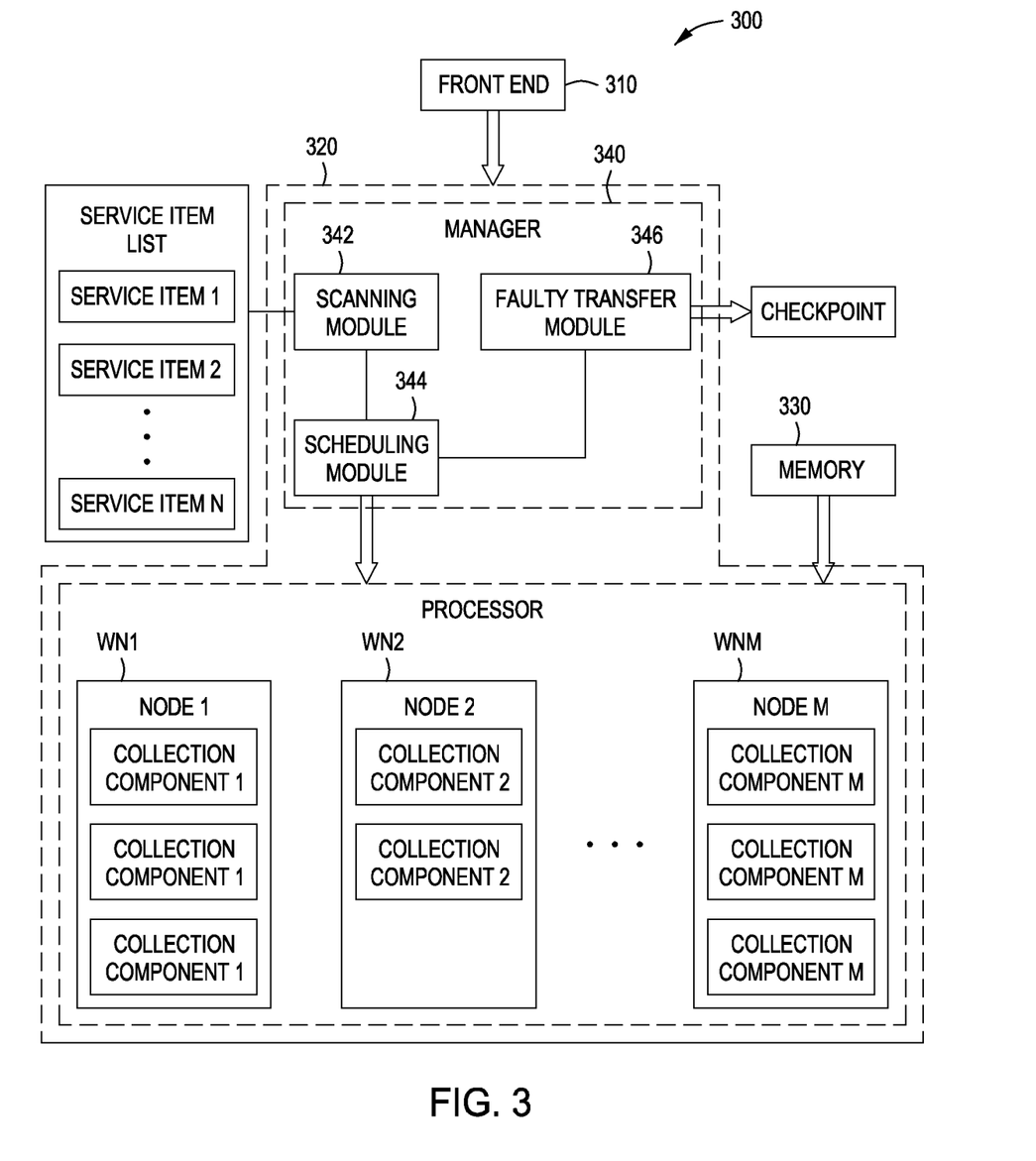
FIG. 3 is a block diagram illustrating an example of a garbage collection system 300 in accordance with the present invention.

FIG. 3 shows a block diagram that illustrates an example of a garbage collection system 300 in accordance with the present invention. As shown in FIG. 3, garbage collection system 300 includes a front end 310, a processor 320, and a memory 330 coupled to processor 320. Memory 330 stores instructions which are executed by processor 320, such as the instructions to execute methods 100 and 200.

Front end 310 of garbage collection system 300 may be a human-machine interaction module for providing a human-machine interaction interface. A user may set up garbage collection system 300 through the interface. For example, functions like start, turn off, or timing may be set up through the interface. Processor 330 includes a manager 340 and a plurality of nodes (workers) WN1-WNm where each worker WN is provided with a collection component.

Manager 340 includes a scanning module (Scanner) 342, a scheduling module (Scheduler) 344, and a faulty transfer module (Failover) 346. Scanner 342 scans all the service items and obtains a service item list. Scheduler 344 is responsible for task scheduling and can obtain a scanning result of the scanner, i.e., a service item list. After this, the scheduler distributes the service types included in the service item as tasks to the corresponding workers WN. Scheduler 344 may also monitor the running state of the garbage collection system, and obtain a garbage collection result.

After the corresponding service type of the collection component has been allocated to a worker WN, the worker WN may execute a specific collection logic set for the collection component. The worker WN may allocate a plurality of thread pools to the collection components. When there are a plurality of thread pools, the garbage collection logics of the corresponding collection components may be executed in parallel, so as to improve the efficiency of the garbage collection.

In the process of performing garbage collection for the service item, faulty transfer module 346 in manager 340 may monitor the garbage collection progress, mark a monitored garbage collection progress as a checkpoint at regular intervals, and perform breakpoint recovery based on the checkpoint.

To better understand the garbage collection method provided in this embodiment, the following example is used for illustration. Service items include, but are not limited to, Taobao, Alibaba, AMAP, and AliPay. Service types include real-time query, machine learning, streaming calculation, online monitoring, and offline calculation.

One service type corresponds to one or more collection components, and each collection component is provided on a worker WD in garbage collection system 300. For example, real-time query corresponds to a collection component which is marked as a collection component 1, and the collection component 1 is provided on a worker 1.

The machine learning corresponds to two collection components which are marked as collection components 2 and 3, and the collection components 2 and 3 are respectively provided on a worker 2 and a worker 3. Streaming calculation corresponds to a collection component which is marked as a collection component 4, and the collection component 4 is provided on a worker 4. Online monitoring corresponds to a collection component which is marked as a collection component 5, and the collection component 4 is provided on a worker 5. The offline monitoring corresponds to three collection components which are marked as a collection component 6, a collection component 7, and a collection component 8, and the collection components 6, 7, and 8 are respectively provided on workers 6, 7, and 8.

One service item includes a plurality of target service types. For example, AMAP's service item includes target service types such as real-time query and streaming calculation. The target service types in Taobao's service item include real-time query, streaming calculation, and online monitoring. The target service types in Alibaba's service item include real-time query, machine learning, and streaming calculation. The target service types in AlipPay's service item include real-time query, machine learning, and online monitoring.

When scanner 342 in garbage collection system 300 scans all the service items, target service types included in each service item are obtained, and all the service item scanning results are used to generate a service item list. Scheduler 344 obtains target collection components associated with the service items according to the service item list, and then allocates the target service types in the service item to the corresponding workers WN. The worker WN performs garbage collection for the corresponding service types based on garbage collection logic of the target collection components.

For example, the target service types in AMAP's service item include real-time query and streaming calculation. In order to perform garbage collection for the service item, corresponding target collection components need to be invoked, wherein the target collection components include a collection component 1 and a collection component 4. The garbage of the service item is collected based on the collection component 1 and the collection component 4. The collection component 1 is used to collect garbage of real-time query, whereas the collection component 4 is used to collect garbage of streaming calculation. In this example, the worker WN may allocate a plurality of thread pools to the target collection components. The target collection components may execute target collection components in parallel through a plurality of thread pools, so as to improve the garbage collection efficiency.

The target service types in Taobao's service item include real-time query, streaming calculation, and online monitoring. Target collection components needed to perform garbage collection on the service item include the collection components 1, 4, and 5. The garbage of the Taobao's service item is collected based on the collection components 1, 4, and 5. For the specific processes, reference can be made to the processing process of AMAP's service item. Details are not provided herein.

When all the service items do not include the real-time query as the target service type, scheduler 344 may instruct the worker 1 to delete the corresponding collection component 1. When only some service items do not include the real-time query as the target service type, the collection component 1 corresponding to the real-time query target service type cannot be deleted. For example, when Alibaba's service item does not include the real-time query as the target service type, and the Taobao's service item still includes the real-time query as the target service type, the collection component 1 corresponding to the target service type cannot be deleted.

When a new target service type is added, the target collection component corresponding to the new target service type needs to be added. For example, when the newly added target service type is offline calculation, a collection component 6 of the offline calculation target service is added accordingly; and the collection component 6 is provided on a corresponding worker WN.

When the newly added target service type is applied to the Taobao's service item and when Taobao's service items are scanned, it can be obtained that the Taobao's service items include real-time query, streaming calculation, online monitoring, and offline calculation. Accordingly, the target collection components include a collection component 1, a collection component 4, a collection component 5, and a collection component 6.

In the process of performing garbage collection on the service item, the failover may monitor the garbage collection progress, mark a monitored garbage collection progress as a checkpoint at regular intervals, and perform breakpoint recovery based on the checkpoint. For example, when an abnormal situation occurs in the garbage collection process, the garbage collection process will be interrupted. When the process is rerun, the garbage collection progress when the interruption occurs can be obtained from the checkpoint, and the garbage collection is resumed from the progress so as to avoid repeating the previous operation.

Figure 4:
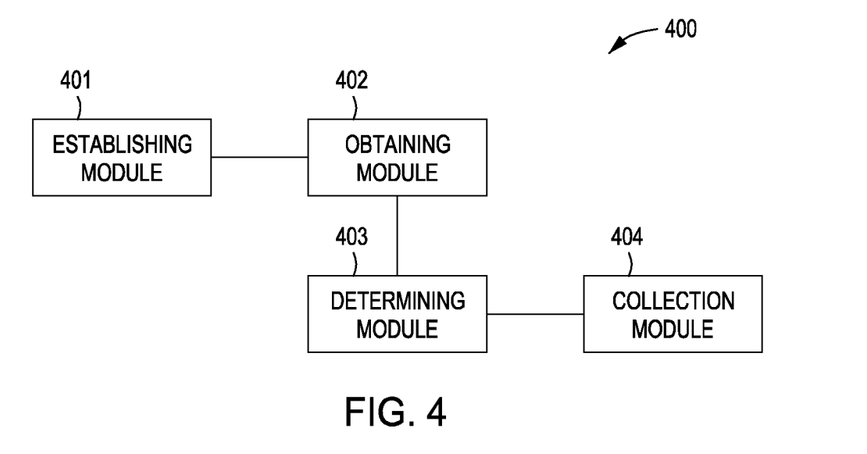
FIG. 4 is a block diagram illustrating an example of a garbage collection apparatus 400 in accordance with the present invention.

FIG. 4 shows a block diagram that illustrates an example of a garbage collection apparatus 400 in accordance with the present invention. As shown in FIG. 4, garbage collection apparatus 400 includes an establishing module 401, an obtaining module 402, a determining module 403, and a collection module 404.

Establishing module 401 establishs corresponding collection components for different service types before the obtaining module obtains the service types included in all service items, wherein one service type corresponds to at least one collection component. Before target service types included in all service items are obtained, collection components that correspond to different service types are established.

Specifically, a collection component that corresponds to each service type is established. Yet in actual applications, some service types have the same garbage collection logic. In order to save resources, the service types having the same garbage collection logic may share and reuse one collection component. For the process of establishing corresponding collection components for different service types by the establishing module 10, reference can be made to the description in the above embodiment to avoid repetition.

Obtaining module 402 obtains target service types included in all service items, wherein different service types correspond to different collection components. In order to dynamically expand the garbage type, in this embodiment, the garbage collection logic is encapsulated by the collection component, and the collection component has a hot-swap function. Based on the collection component, the garbage type can be flexibly expanded.

Further, in order to implement collection of a large amount of heterogeneous garbage types, in this embodiment, different collection components are established for different service types. Generally, one service type corresponds to at least one collection component. In this embodiment, the collection component established by using the service type as the granularity improves the versatility, making the method applicable to the environment where big data processing is needed.

In this embodiment, obtaining module 402 scans all the service items and obtains target service types included in all service items. Determining module 403 determines target collection components corresponding to the target service types. After the target service types included in all the service items are obtained by obtaining module 402, because each service type corresponds to at least one collection component, the target collection component corresponding to the target service type is determined by determining module 403 according to the included target service type.

Collection module 404 collects garbage for the corresponding target service types by using each of the target collection components. After obtaining the target collection components, collection module 404 collects garbage for the corresponding target service types by using the target collection components.

Specifically, the target service types included in each service item are used as a task which is allocated to corresponding target collection components. All the target collection components are loaded. Thread pools needed by the target collection components are allocated. The target collection components are started to use the allocated thread pools to execute the garbage collection logic, and the target collection components perform garbage collection for the corresponding target service types.

In the garbage collection apparatus provided in this embodiment, target service types included in all service items are obtained. Target collection components corresponding to the target service types are determined, and garbage for the corresponding target service types are collected by using the target collection components.

In this embodiment, collection components are established by using the service type as granularity, and different collection components are established to correspond to different service types. Performing garbage collection based on these components can flexibly extend the scope of the service types, thereby achieving the collection of heterogeneous service types with good versatility.

Figure 5:
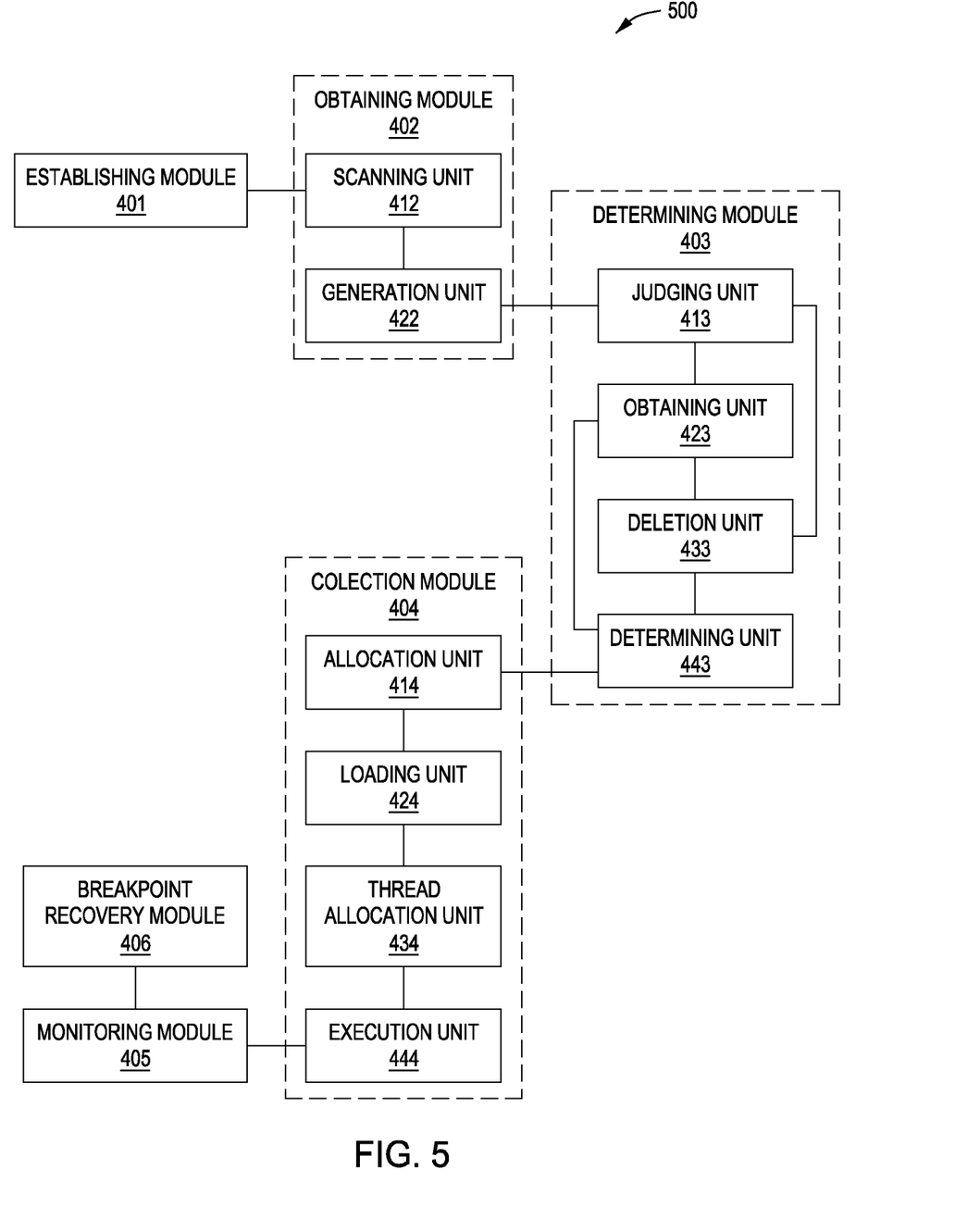
FIG. 5 is a block diagram illustrating an example of a garbage collection apparatus 500 in accordance with the present invention.

FIG. 5 shows a block diagram that illustrates an example of a garbage collection apparatus 500 in accordance with the present invention. Garbage collection apparatus 500 is similar to garbage collection apparatus 400 and, as a result, utilizes the same reference numerals to designate the structures that are common to both apparatus 400 and apparatus 500.

As shown in FIG. 5, garbage collection apparatus 500 differs from garbage collection apparatus 400 in that garbage collection apparatus 500 illustrates exemplary detail for obtaining module 402, determining module 403, and collection module 404. Garbage collection apparatus 500 also includes a monitoring module 405 and a breakpoint recovery module 406.

Establishing module 401 is specifically configured to establish a corresponding collection component for all the service types having the same garbage collection logic, and respectively establish corresponding collection components for each of the other service types, wherein all the service types having the same garbage collection logic share and reuse the corresponding collection component.

In this embodiment, an optional structure of obtaining module 402 includes a scanning unit 412 and a generation unit 422. Scanning unit 412 scans all of the service items. Generation unit 422 generates a service item list based on a scanning result. The service item list comprises the target service types comprised in all the service items.

In this embodiment, an optional structure of determining module 403 includes a judging unit 413, an obtaining unit 423, a deletion unit 433, and a determining unit 443. Judging unit 413 judges whether a new target service type exists in the service item list. When judging unit 413 judges that a new target service type exists, obtaining unit 423 obtains a new target collection component corresponding to the new target service type.

Further, obtaining unit 423 is further configured to do the following: when the judging unit judges that no new target service type exists, obtain deleted target service types of each service item according to the service item list. Further, judging unit 413 further judges whether the target collection component corresponding to the deleted target service type is shared and reused by other target service types in the service item list.

When judging unit 413 judges that the target collection component corresponding to the deleted service type is not shared and reused, deletion unit 433 deletes the target collection component corresponding to the deleted service type. Determining unit 443 determines target collection components that correspond to other target service types in the service item list, wherein the other target service types refer to target service types other than the new target service types and the deleted target service types in the service item list.

In this embodiment, an optional structure of collection module 404 includes an allocation unit 414, a loading unit 424, a thread allocation unit 434, and an execution unit 444. Allocation unit 414 treats the target service types included in each service item as a task and allocating each task to all the corresponding target collection components. Loading unit 424 loads all the target collection components. Thread allocation unit 434 allocates thread pools needed by each of the target collection components.

Execution unit 444 starts the target collection components to use the allocated thread pools to execute the garbage collection logic to perform garbage collection for corresponding target service types. Monitoring module 405 monitors, in the process of using the target collection components to collect garbage for the corresponding target service types, a garbage collection progress and use the monitored garbage collection progress as a checkpoint.

Breakpoint recovery module 406 performs, when a breakpoint occurs in the garbage collection process, breakpoint recovery by using the checkpoint closest to the breakpoint time. Methods 100 and 200 can be implemented in the garbage collection apparatus 500 shown in FIG. 5.

In this embodiment, collection components are established by using the service type as granularity, and different collection components are established to correspond to different service types. Performing garbage collection based on these components can flexibly extend the scope of the service types, thereby achieving the collection of heterogeneous service types with good versatility.

In this embodiment, performing garbage collection based on the collection components meets the needs for collecting a large amount of heterogeneous garbage types on a big data open processing platform. Based on the hot-swap function of the collection components, the collection components have good dynamic extensibility and can effectively support garbage generated by new service types, which in turn is applicable to a big data processing environment. In the garbage collection process, if an abnormal situation occurs which the garbage collection to be interrupted, breakpoint recovery may be performed based on the closest checkpoint.

Figure 6:
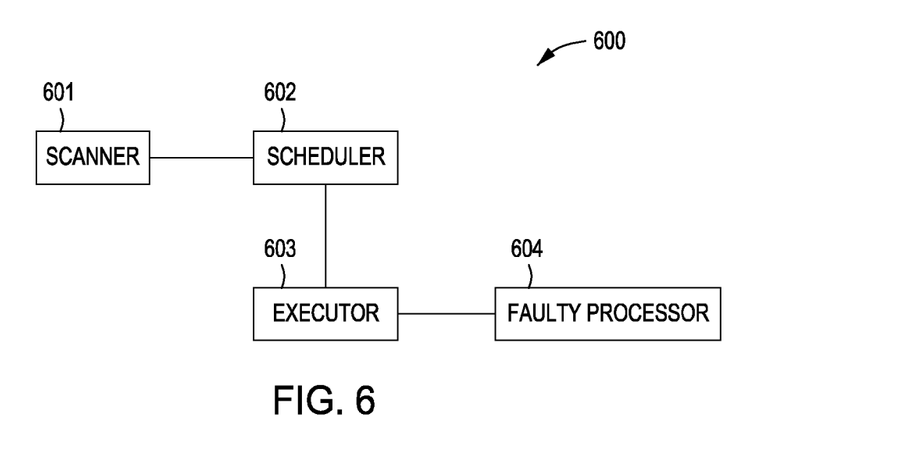
FIG. 6 is a block diagram illustrating an example of a garbage collection manager 600 in accordance with the present invention.

FIG. 6 shows a block diagram that illustrates an example of a garbage collection manager 600 in accordance with the present invention. As shown in FIG. 6, garbage collection manager 600 includes a scanner 601, a scheduler 602, and an executor 603. Scanner 601 obtains target service types comprised in all service items, wherein different service types correspond to different collection components.

Scheduler 602 determines target collection components corresponding to each of the target service types. Executor 603 collects garbage for the corresponding target service types by using each of the target collection components. Further, executor 603 establishs corresponding collection components for different service types before the scanner obtains the service types comprised in all service items, wherein one service type corresponds to at least one collection component.

Executor 603 is specifically configured to establish a collection component that corresponds to all the service types having the same garbage collection logic, and respectively establish corresponding collection components for each of the other service types. All the service types having the same garbage collection logic share and reuse the corresponding collection component.

Scanner 601 is specifically configured to scan all the service items and generate a service item list based on a scanning result, wherein the service item list comprises the target service types comprised in all the service items. Scheduler 602 is specifically configured to do the following: after the scanner generates the service item list, judge whether a new target service type exists in the service item list; and when it is judged that a new target service type exists, obtain a new target collection component corresponding to the new target service type.

Scheduler 602 is further specifically configured to do the following: when it is judged that no new target service type exists, obtain deleted target service types of each service item according to the service item list; judge whether the target collection component corresponding to the deleted target service type is shared and reused by other target service types in the service item list; delete the target collection component corresponding to the deleted service type when it is judged that the target collection component corresponding to the deleted service type is not shared and reused; determine corresponding target collection components for other target service types in the service item list, wherein the other target service types refer to target service types other than the new target service types and the deleted target service types in the service item list; and treat the target service types comprised in each service item as a task and allocate the tasks to the executor.

Executor 603 is specifically configured to receive the tasks allocated by the scheduler, allocate the tasks to all the corresponding target collection components, load all the target collection components, allocate thread pools needed by the target collection components, and start the target collection components to use the allocated thread pools to execute the garbage collection logic to perform garbage collection for the corresponding target service types.

Garbage collection manager 600 further includes a faulty processor 604. Faulty processor 604 is configured to do the following: in the process of using the target collection components to collect garbage for the corresponding target service types, monitor a garbage collection progress and using the monitored garbage collection progress as a checkpoint.

Faulty processor 604 is further configured to perform, when a breakpoint occurs in the garbage collection process, breakpoint recovery by using the checkpoint closest to the breakpoint time. Methods 100 and 200 can be implemented in garbage collection manager 600 shown in FIG. 6.

In this embodiment, collection components are established by using the service type as granularity, and different collection components are established to correspond to different service types. Performing garbage collection based on these components can flexibly extend the scope of the service types, thereby achieving the collection of heterogeneous service types with good versatility.

In this embodiment, performing garbage collection based on the collection components meets the needs for collecting a large amount of heterogeneous garbage types on a big data open processing platform. Based on the hot-swap function of the collection components, the collection components have good dynamic extensibility and can effectively support garbage generated by new service types, which in turn is applicable to a big data processing environment. In the garbage collection process, if an abnormal situation occurs which the garbage collection to be interrupted, breakpoint recovery may be performed based on the closest checkpoint.

Those skilled in the art can understand that all or part of the steps for implementing the method in above embodiments can be accomplished by hardware related to program instructions. The aforementioned program may be stored in a computer-readable storage medium. In execution, the program executes the steps of the method in the above embodiments, and the foregoing storage medium includes various medium that can store program codes, such as a ROM, a RAM, a magnetic disk, or an optical disc.

The above embodiments are merely used for illustrating rather than limiting the technical solutions of the present invention. Although the present application is described in detail with reference to the foregoing embodiments, those of ordinary skill in the art should understand that the technical solutions recorded in the foregoing embodiments may still be modified or equivalent replacement may be made on part or all of the technical features therein. These modifications or replacements will not make the essence of the corresponding technical solutions be departed from the scope of the technical solutions in the embodiments of the present invention.

What is claimed is:

1. A method of garbage collection comprising:
    scanning all service items to generate a first list of scanned service items, the service items including applications stored on a storage media, each service item including one or more target service types, the first list of scanned service items including a number of target service types, the target service types including functions provided by the applications;
    determining a number of target components such that each target service type has a corresponding target component, the number of target components including a number of garbage collecting logics such that each target component has a corresponding garbage collecting logic, each garbage collecting logic being different; and
    collecting garbage for each target service type on the first list of scanned service items using the target component that corresponds with each target service type to collect heterogeneous garbage types.

2. The method according to claim 1, further comprising obtaining a list of listed service types and a list of listed components for collecting garbage that corresponds with the list of listed service types such that each listed service type has a corresponding listed component for collecting garbage.

3. The method according to claim 2, wherein determining a number of target components includes, for each target service type on the first list of scanned service items, matching a target service type to a listed service type on the first list of listed service types, and associating the listed component that corresponds with the listed service type with the target service type to generate a first list of target components for collecting garbage that corresponds with the target service types on the first list of scanned service items such that each target service type has a corresponding target component.

4. The method according to claim 3, further comprising establishing a collection component that corresponds to all the service types having the same garbage collection logic, wherein all the service types having the same garbage collection logic share and reuse the corresponding collection component.

5. The method according to claim 3, further comprising:
    re-scanning all of the service items to generate a second list of scanned service items, the second list of scanned service items including a number of target service types;
    determining if a target service type present on the second list of scanned service items is absent from the first list of scanned service items; and
    for each new target service type present on the second list of scanned service items and absent from the first list of scanned service types,
        matching a new target service type to a listed service type on the list of listed service types;
        associating the listed component that corresponds with the listed service type with the new target service type as a new target component; and
        adding the new target component to the first list of target components to generate a second list of target components for collecting garbage that corresponds with the target service types on the second list of scanned service items such that each target service type on the second list of scanned service items has a corresponding target component on the second list of target components.

6. The method according to claim 3, further comprising:
    re-scanning all of the service items to generate a second list of scanned service items, the second list of scanned service items including a number of target service types;
    determining if a target service type present in the first list of scanned service items is absent from the second list of scanned service items; and for each deleted target service type present on the first list of scanned service items and absent from the second list of scanned service items, determining if a deleted target service type shares a target component with any other target service type.

7. The method according to claim 3, wherein collecting garbage for each target service type on the first list of scanned service items using the target components includes:
treating the target service types included in each service item as a task and allocating each task to all the corresponding target components;
loading all the corresponding target components;
allocating thread pools needed by each of the corresponding target components; and
starting the corresponding target components to use the allocated thread pools to execute the garbage collection logic to perform garbage collection for corresponding target service types.

8. The method according to claim 7, further comprising, while collecting garbage for the corresponding target service types, monitoring a garbage collection progress and using the monitored garbage collection progress as a checkpoint.

9. The method according to claim 8, further comprising, when a breakpoint occurs in the garbage collection process, performing breakpoint recovery by using the checkpoint closest to the breakpoint time.

10. A garbage collection apparatus, comprising:
a memory; and
a processor coupled to the memory to execute instructions stored in the memory, the processor to:
scan all service items to generate a first list of scanned service items, the service items including applications stored on a storage media, each service item including one or more target service types, the first list of scanned service items including a number of target service types, the target service types including functions provided by the applications;
determine a number of target components such that each target service type has a corresponding target component, the number of target components including a number of garbage collecting logics such that each target component has a corresponding garbage collecting logic, each garbage collecting logic being different; and
collect garbage for each target service type on the first list of scanned service items using the target component that corresponds with each target service type to collect heterogeneous garbage types.

11. The apparatus according to claim 10, wherein the processor to further obtain a list of listed service types and a list of listed components for collecting garbage that corresponds with the list of listed service types such that each listed service type has a corresponding listed component for collecting garbage.

12. The apparatus according to claim 11, wherein to determine a number of target components, the processor to further, for each target service type on the first list of scanned service items, match a target service type to a listed service type on the first list of listed service types, and associate the listed component that corresponds with the listed service type with the target service type to generate a first list of target components for collecting garbage that corresponds with the target service types on the first list of scanned service items such that each target service type has a corresponding target component.

13. The apparatus according to claim 12, wherein the processor to further:

re-scan all of the service items to generate a second list of scanned service items, the second list of scanned service items including a number of target service types;
determine if a target service type present in the second list of scanned service items is absent from the first list of scanned service items; and
for each new target service type present on the second list of scanned service items and absent from the first list of scanned service types,
match a new target service type to a listed service type on the list of listed service types;
associate the listed component that corresponds with the listed service type with the new target service type as a new target component; and
add the new target component to the first list of target components to generate a second list of target components for collecting garbage that corresponds with the target service types on the second list of scanned service items such that each target service type on the second list of scanned service items has a corresponding target component on the second list of target components.

14. The apparatus according to claim 12, wherein the processor to further:
re-scan all of the service items to generate a second list of scanned service items, the second list of scanned service items including a number of target service types;
determine if a target service type present in the first list of scanned service items is absent from the second list of scanned service items; and
for each deleted target service type present on the first list of scanned service items and absent from the second list of scanned service items, determine if a deleted target service type shares a target component with any other target service type.

15. The apparatus according to claim 10, further comprising:
a scanner, configured to obtain target service types comprised in all service items, wherein different service types correspond to different collection components;
a scheduler, configured to determine target collection components corresponding to each of the target service types; and
an executor, configured to collect garbage for the corresponding target service types by using each of the target collection components,
wherein the executor is further configured to establish corresponding collection components for different service types before the scanner obtains the service types comprised in all service items, wherein one service type corresponds to at least one collection component,
wherein the executor is specifically configured to establish a collection component that corresponds to all the service types having the same garbage collection logic, and respectively establish corresponding collection components for each of the other service types, wherein all the service types having the same garbage collection logic share and reuse the corresponding collection component.

16. The apparatus according to claim 15, wherein the scanner is specifically configured to scan all the service items and generate a service item list based on a scanning result, wherein the service item list comprises the target service types comprised in all the service items.

17. The apparatus according to claim 16, wherein the scheduler is specifically configured to do the following: after the scanner generates the service item list, judge whether a new target service type exists in the service item list; and when it is judged that a new target service type exists, obtain a new target collection component corresponding to the new target service type.

18. The apparatus according to claim 17, wherein the scheduler is further specifically configured to do the following: when it is judged that no new target service type exists, obtain deleted target service types of each service item according to the service item list; judge whether the target collection component corresponding to the deleted target service type is shared and reused by other target service types in the service item list; delete the target collection component corresponding to the deleted service type when it is judged that the target collection component corresponding to the deleted service type is not shared and reused; determine corresponding target collection components for other target service types in the service item list, wherein the other target service types refer to target service types other than the new target service types and the deleted target service types in the service item list; and treat the target service types comprised in each service item as a task and allocate the tasks to the executor.

19. The apparatus according to claim 15, wherein the executor is specifically configured to receive the tasks allocated by the scheduler, allocate the tasks to all the corresponding target collection components, load all the target collection components, allocate thread pools needed by the target collection components, and start the target collection components to use the allocated thread pools to execute the garbage collection logic to perform garbage collection for the corresponding target service types.

20. The apparatus according to claim 19, further comprising:
a faulty processor, configured to do the following: in the process of using the target collection components to collect garbage for the corresponding target service types, monitor a garbage collection progress and using the monitored garbage collection progress as a checkpoint.

21. The apparatus according to claim 20, wherein the faulty processor is further configured to perform, when a breakpoint occurs in the garbage collection process, breakpoint recovery by using the checkpoint closest to the breakpoint time.

22. A non-transitory computer-readable storage medium having embedded therein program instructions, which when executed by a processor causes the processor to execute a method of unlocking a shared object, the method comprising:
scanning all service items to generate a first list of scanned service items, the service items including applications stored on a storage media, each service item including one or more target service types, the first list of scanned service items including a number of target service types, the target service types including functions provided by the applications;
determining a number of target components such that each target service type has a corresponding target component, the number of target components including a number of garbage collecting logics such that each target component has a corresponding garbage collecting logic, each garbage collecting logic being different; and
collecting garbage for each target service type on the first list of scanned service items using the target component that corresponds with each target service type to collect heterogeneous garbage types.

23. The medium according to claim 22, wherein the method further comprises obtaining a list of listed service types and a list of listed components for collecting garbage that corresponds with the list of listed service types such that each listed service type has a corresponding listed component for collecting garbage.

24. The medium according to claim 23, wherein determining a number of target components includes, for each target service type on the first list of scanned service items, matching a target service type to a listed service type on the first list of listed service types, and associating the listed component that corresponds with the listed service type with the target service type to generate a first list of target components for collecting garbage that corresponds with the target service types on the first list of scanned service items such that each target service type has a corresponding target component.

25. The medium according to claim 24, wherein the method further comprises establishing a collection component that corresponds to all the service types having the same garbage collection logic, wherein all the service types having the same garbage collection logic share and reuse the corresponding collection component.

26. The medium according to claim 24, wherein the method further comprises:
re-scanning all of the service items to generate a second list of scanned service items, the second list of scanned service items including a number of target service types;
determining if a target service type present in the second list of scanned service items is absent from the first list of scanned service items; and
for each new target service type present on the second list of scanned service items and absent from the first list of scanned service types,
matching a new target service type to a listed service type on the list of listed service types;
associating the listed component that corresponds with the listed service type with the new target service type as a new target component; and
adding the new target component to the first list of target components to generate a second list of target components for collecting garbage that corresponds with the target service types on the second list of scanned service items such that each target service type on the second list of scanned service items has a corresponding target component on the second list of target components.

27. The medium according to claim 24, wherein the method further comprises:
re-scanning all of the service items to generate a second list of scanned service items, the second list of scanned service items including a number of target service types;
determining if a target service type present in the first list of scanned service items is absent from the second list of scanned service items; and
for each deleted target service type present on the first list of scanned service items and absent from the second list of scanned service items, determining if a deleted target service type shares a target component with any other target service type.

* * * * *